United States Patent [19]

Nakajima

[11] Patent Number: 5,073,827
[45] Date of Patent: Dec. 17, 1991

[54] IMAGE COMMUNICATION APPARATUS

[75] Inventor: Toshifumi Nakajima, Tokyo, Japan

[73] Assignee: Canon Kabushiki Kaisha, Tokyo, Japan

[21] Appl. No.: 244,305

[22] Filed: Sep. 15, 1988

[30] Foreign Application Priority Data

Sep. 22, 1987 [JP] Japan .................. 62-239473
Sep. 29, 1987 [JP] Japan .................. 62-247599

[51] Int. Cl.$^5$ ................ H04N 1/00; H04N 1/32
[52] U.S. Cl. ...................... 358/437; 358/400
[58] Field of Search ........... 358/256, 257, 400, 401, 358/404, 407, 434, 437, 438, 439, 436; 379/100

[56] References Cited

U.S. PATENT DOCUMENTS

| | | | |
|---|---|---|---|
| 3,920,896 | 11/1975 | Bishop | 358/257 |
| 4,249,216 | 2/1981 | Kanda | 358/257 |
| 4,563,706 | 1/1986 | Nagashima | 358/256 |
| 4,573,083 | 2/1986 | Shimizu | 358/257 |
| 4,589,033 | 5/1986 | Burton | 358/256 |
| 4,672,460 | 6/1987 | Tsuda | 358/257 |
| 4,719,514 | 1/1988 | Kurahayashi | 358/280 |

FOREIGN PATENT DOCUMENTS 0281569  12/1987  Japan .

Primary Examiner—Jin F. Ng
Assistant Examiner—Jerome Grant, II
Attorney, Agent, or Firm—Fitzpatrick, Cella, Harper & Scinto

[57] ABSTRACT

An image communication apparatus includes a RAM for storing image data, a transmitting unit including a modem and an NCU for performing transmission of the image data, a receiving unit including the modem for receiving the image data and storing the received image data in the RAM, a recording unit including a DMA controller for recording the image data in the RAM, a key in a keyboard for instructing image data transmission from the transmitting unit, and a CPU for temporarily interrupting an operation of the recording unit in response to an instruction from the key during recording of the recording unit and for operating the transmitting unit.

11 Claims, 3 Drawing Sheets

IMAGE COMMUNICATION APPARATUS

BACKGROUND OF THE INVENTION

1. Field of the Invention

The present invention relates to an image communication apparatus.

2. Related Background Art

In an image communication apparatus of this type such as a facsimile apparatus having a memory reception function, all received data are stored in a memory, the line is released from the facsimile apparatus, and the received image is then read out from the memory and is recorded.

In the transmission mode, the read original image is stored in the memory. When all data are completely read, the image data is transmitted from the memory.

In a conventional image communication apparatus of this type, transmission cannot be performed during data recording in a memory although a line is not busy.

Transmission is started at the end of data reception and recording or by interrupting data reception and recording.

However, when transmission is performed by interrupting data reception, reception and recording must be restarted from the beginning. The received data is of no use.

Prior art patent applications concerning storage of received data in a memory are U.S. Ser. No. 823,118, U.S. Ser. No. 823,075, U.S. Ser. No. 855,704, U.S. Ser. No. 913,997, U.S. Ser. No. 914,652, U.S. Ser. No. 942,208, U.S. Ser. No. 150,659, U.S. Ser. No. 813,514, U.S. Ser. No. 120,104, U.S. Ser. No. 798,316 and U.S. Ser. No. 147,224 filed on behalf of the assignee of the present applicant.

SUMMARY OF THE INVENTION

It is an object of the present invention to improve an image communication apparatus.

It is another object of the present invention to eliminate the conventional drawbacks described above.

It is still another object of the present invention to temporarily interrupt recording upon generation of a transmission instruction during recording when a received image is recorded after completion of reception.

It is still another object of the present invention to provide an image communication apparatus capable of efficiently performing recording and image transmission when the image in the memory is recorded after the received image is stored in a memory and reception is completed.

It is still another object of the present invention to temporarily interrupt reception and recording upon reception of a transmission instruction during reception and recording and to restart reception and recording when transmission is completed.

It is still another object of the present invention to allow transmission during reception and recording and effectively utilize a communication line.

The above and other objects, features, and advantages of the present invention will be apparent from the detailed description of a preferred embodiment in conjunction with the accompanying drawings.

DETAILED DESCRIPTION OF THE PREFERRED EMBODIMENT

An embodiment of the present invention will be described with reference to the accompanying drawings.

Figure 1:
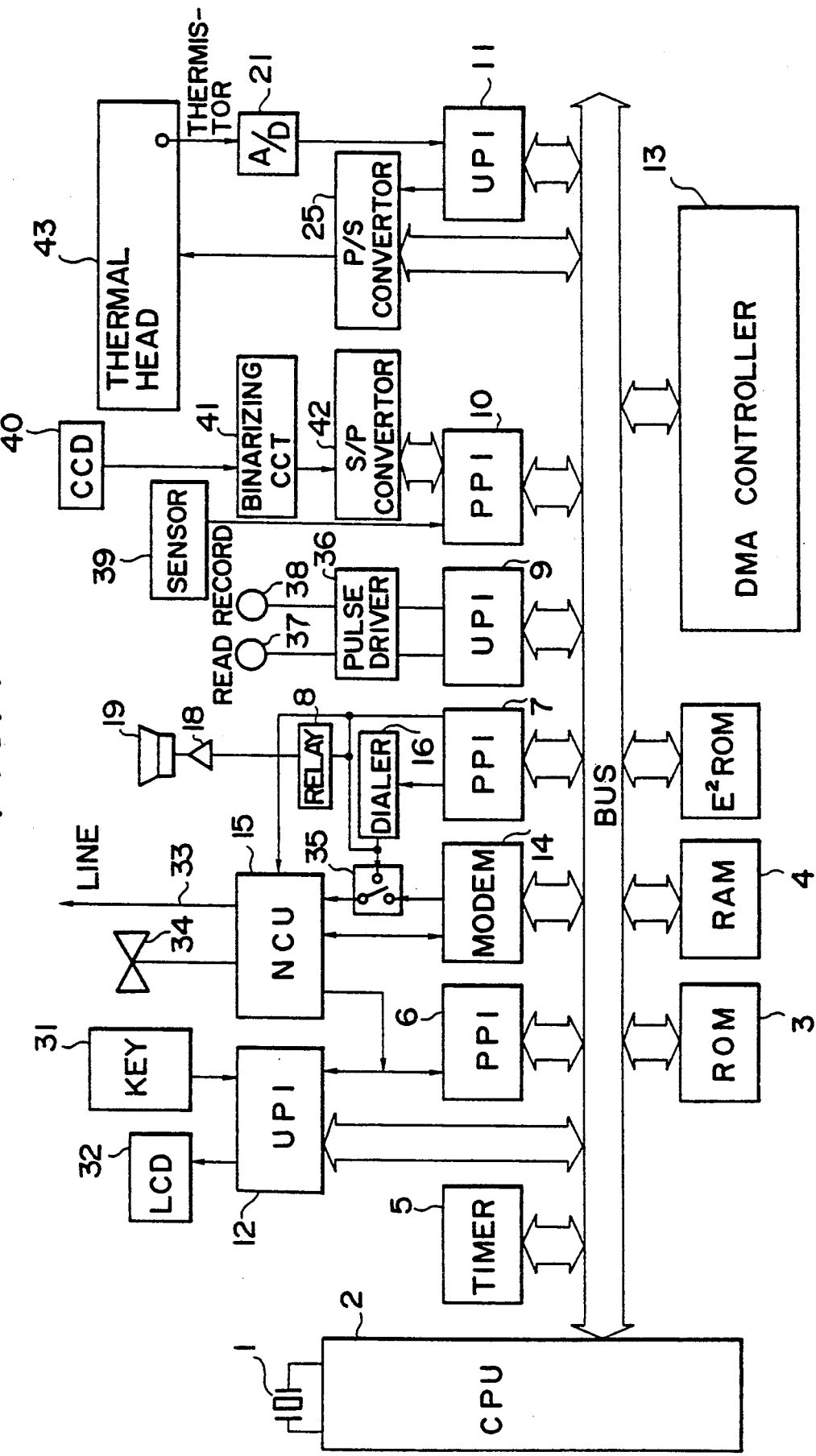
FIG. 1 is a block diagram showing an arrangement of a facsimile apparatus according to an embodiment of the present invention.

FIG. 1 is a block diagram showing an overall arrangement of a facsimile system according to an embodiment of the present invention. Referring to FIG. 1, the facsimile apparatus includes a quartz oscillator 1 for generating reference clocks for controlling the overall operation of the apparatus.

An output clock from the quartz oscillator 1 is supplied as a reference clock to a CPU (central processing unit) 2 comprising desired microprocessing elements. The CPU 2 is connected to a ROM (Read-Only Memory) 3, a RAM (Random Access Memory) 4, a timer 5, PPIs (Programmable Parallel I/Os) 6, 7 and 10, and UPIs (peripheral CPUs) 9, 11, and 12 through data and address buses. The CPU 2 controls the overall operation of the facsimile apparatus. The CPU 2 performs encoding and decoding of image data.

The UPI 9 controls driving of an original and a recording sheet.

The UPI 11 controls a parallel-to-serial (P/S) converter 25 and a recording system of a thermal head 43.

The UPI 12 controls a keyboard 31 and a liquid crystal display unit (LCD) 32.

A modem 14 performs modulation and demodulation of the image data and exchanges procedure signals of facsimile communication procedures.

A network control unit (NCU) 15 connects a line 33 to a telephone set 34 or the modem 14.

A dialer 16 sends a dial signal (a tone dial signal or a pulse dial signal) to the line 33 in accordance with destination telephone number data output from the CPU 2 through the PPI 7.

A speaker drive circuit 18 supplies a signal from the line 33 to a speaker 19 in accordance with an ON state of a relay 8, and a tone is produced at the speaker 19.

A pulse motor driver 36 drives a read motor 37 and a record motor 38 in accordance with the control under the UPI 9.

An original sensor 39 outputs a detection signal when an original is set on an original reader.

Solid-state image pickup elements (CCD line sensor) 40 which are arranged in a line to read the original set on the reader and convert a read image into an electrical signal.

A binarizing circuit 41 binarizes an analog image signal read by the CCD 40 and outputs a converted signal as a serial digital image signal.

A serial-to-parallel (S/P) converter 42 converts the serial digital image signal into a parallel signal having a predetermined bit.

An analog-to-digital (A/D) converter 21 converts an analog signal from a thermistor for detecting a temperature of the thermal head 43 into a digital signal, and the digital signal is output to the UPI 11.

A DMA controller 13 stores the received image data in the RAM 4. The RAM 4 is a large-capacity memory which can store image data of about 40 standard originals (A4 size) (the memory capacity of the RAM 4 can be increased).

Figure 2:
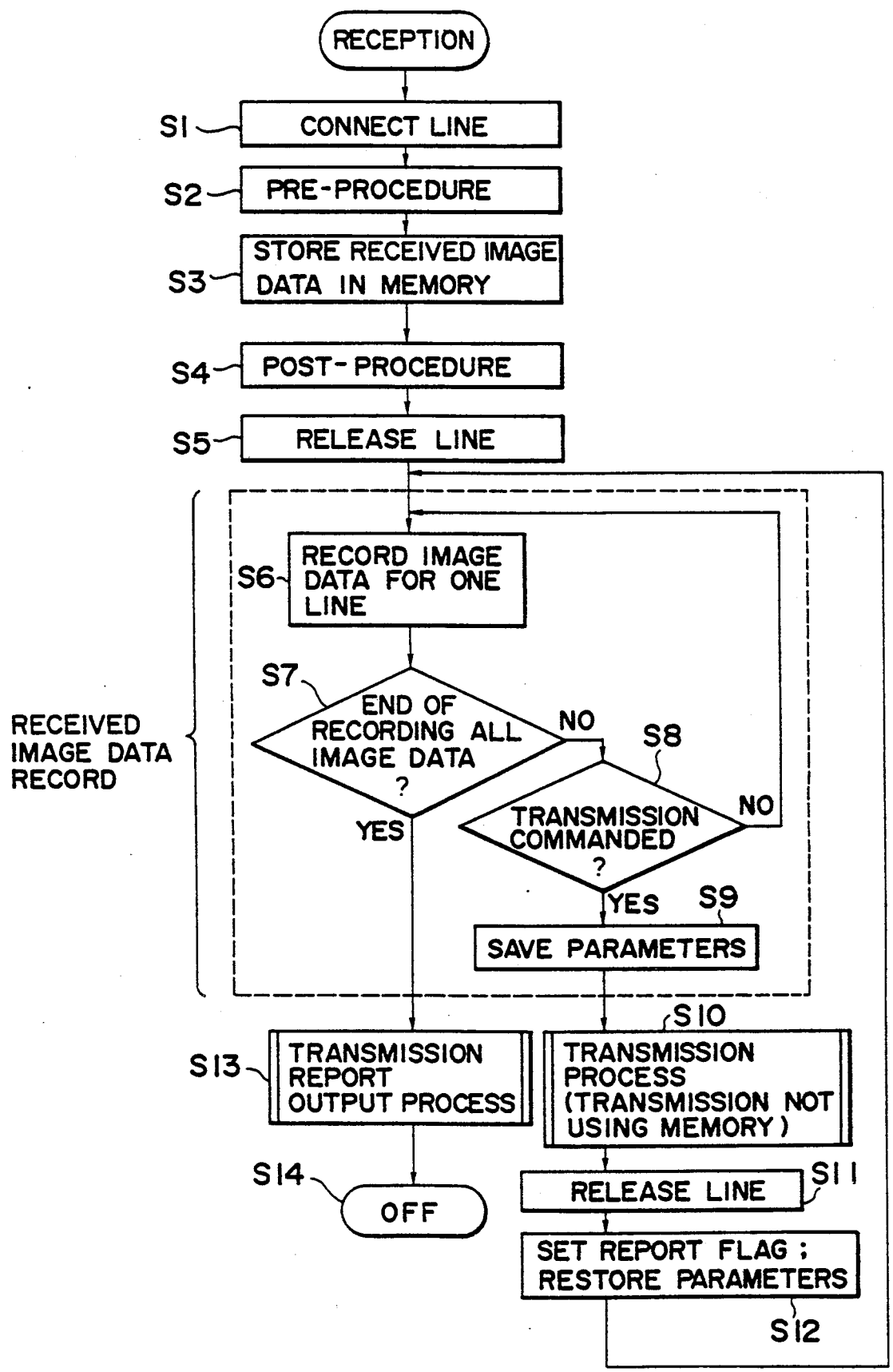
FIG. 2 is a flow chart showing reception of the facsimile apparatus shown in FIG. 1.

FIG. 2 is a flow chart showing reception control of the CPU 2 in this embodiment. The operation of the apparatus of this embodiment will be described with reference to the flow chart.

When a call signal (Ci signal) detector arranged in the NCU 15 detects a call signal from the line 33, a detection signal is output from the NCU 15 to the CPU 2 through the PPI 6. In step S1, when the CPU 2 receives the Ci detection signal, the CPU 2 outputs a line connection signal to the NCU 15 through the PPI 7, thereby causing the NCU 15 to capture the line 33.

In step S2, the relay 35 is switched to the modem 14 side, and a facsimile communication procedure (pre-procedure) complying with the CCITT (International Consultative Committee for Telephone and Telegraph) recommendations through the modem 14. When the communication mode is set in accordance with the facsimile communication procedure, received image data is stored in the RAM 4 through the NCU 15 and the modem 14. When all data are received, the flow advances to step S4. In step S4, a facsimile communication procedure (post-procedure) is executed. In step S5, a line release signal is output to the NCU 15 through the PPI 7, thereby releasing the line from the NCU 15. In this manner, the received image data is stored in the RAM 4.

When the line 33 is released in step S5, the flow advances to step S6. In this step, the received image data stored in the RAM 4 are read out therefrom line by line. The readout data is demodulated and output to the thermal head 43 through the parallel-to-serial converter 25. At the same time, the record motor 38 is operated through the UPI 9. In step S7, the CPU 2 determines whether all data can be completely recorded. If NO in step S7, the flow advances to step S8. The CPU 2 determines in step S8 whether a transmission instruction is input with a key on the keyboard 31. If NO in step S8, the flow returns to step S6, and recording of the next line is performed. The operations in steps S6 to S8 are repeated to read out the received image data from the RAM 4, and the received image data is recorded. When a transmission instruction is input during recording, the flow advances from step S8 to step S9. In step S9, recording is temporarily interrupted. The data address of the RAM 4 and the recording mode information are stored in a saving area allocated in the RAM 4. In step S10, transmission is executed. Transmission processing in step S10 includes dialing, reading of the original, encoding, execution of the facsimile communication procedure, and transmission of the original image.

When transmission processing in step S10 is completed, the flow advances to step S11. The line 33 is released in the same manner as in step S5. A report flag for outputting a transmission management report is set. The data address and the recording mode information which are stored in the saving area of the RAM 4 are read out and set. The flow returns to step S6, and the interrupted recording operation is restarted.

When recording of the received data in the RAM 4 is completed, the flow advances from step S7 to step S13. Since the report flag is set, a report (i.e., a report concerning a destination name, the number of pages of transmitted images, a transmission time, and the transmission mode) concerning transmission of the original images transmitted during interruption of recording is recorded and output. Therefore, recording is perfectly performed without partially losing the transmission report transmitted through an interrupt operation during reception and recording.

In the above embodiment as described above, when the transmission instruction is input during transmission and recording, reception and recording are temporarily interrupted. After transmission is completed, the interrupted recording operation is automatically restarted.

Figure 3:
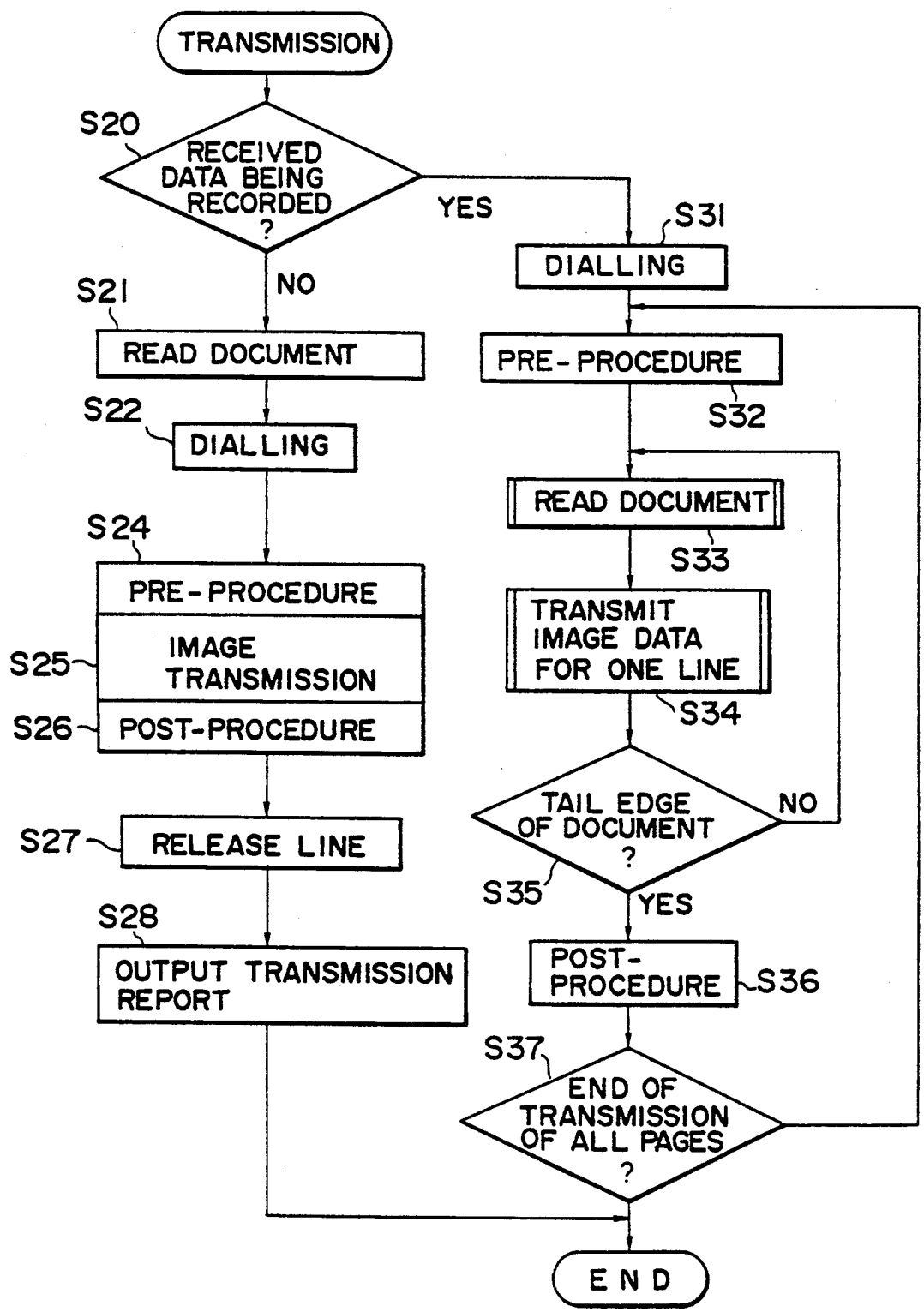
FIG. 3 is a flow chart showing transmission of the facsimile apparatus shown in FIG. 1.

FIG. 3 is a flow chart showing transmission control of the CPU 2.

The CPU 2 determines in step S20 whether reception and recording are being performed. If NO in step S20, the flow advances to step S21. If YES in step S20, the flow advances to step S31. In step S21, the read motor 37 is driven through the UPI 9 and the pulse motor driver 36 in response to an original detection signal from the sensor 39. At the same time, an image signal of an original read by the CCD 40 is input through the binarizing circuit 41, the serial-to-parallel converter 42, and the PPI 10. The input image signal is encoded, and the encoded signal is stored in a transmission image area of the RAM 4. When all the originals are read, the flow advances to step S22. A destination telephone number is dialed in accordance with a key input from the keyboard 31 in the following manner. The relay 35 is switched to the dialer side. The number of times of dialing is detected by the NCU 15, and dial data is output to the dialer 16 through the PPI 7. When the line is connected to the destination by dialing in step S22, the facsimile communication procedure (pre-procedure) complying with the CCITT recommendations is executed in step S24. The transmission mode is set in accordance with the facsimile communication procedure. The image data is read out from the RAM 4 through the modem 14 and the NCU 15 in step S25 and transmitted onto the line 33. When transmission of all the image data is completed, the facsimile communication post-procedure is performed in step S26. The line is released in step S27, and the transmission management report is recorded and output in step S28.

When the transmission instruction is input during reception and recording and the flow advances from step S20 to step S31, dialing is performed in the same manner as in step S22. The pre-procedure is performed in step S32. A one-page original is sequentially read and encoded, and the encoded data is transmitted to the destination through the modem 14 and the NCU 15 in steps S33, S34, and S35. When one-page original transmission is completed, the post-procedure is performed in step S36. The CPU 2 determines in step S37 whether all pages are transmitted. If NO in step S37, the flow returns to step S32, and transmission is restarted.

In the above embodiment, normal transmission is performed by transmission of data from the memory. Transmission during reception and recording is performed such that an original is read on the real-time basis. Therefore, an urgent original can be sent to the destination as fast as possible. Control of the RAM 4 can be simplified, and restarting of reception and recording can be smoothly performed.

The above embodiment exemplifies the facsimile apparatus. However, the present invention is also applicable to a telex or teletex which transmits and receives document data in the form of a code and which records and outputs it in the form of a document image.

According to the present invention, transmission can be performed during reception and recording without wasting reception and recording.

In the above embodiment, when the transmission instruction is input during reception and recording, reception and recording are temporarily interrupted and then transmission is performed. When transmission is completed, the interrupted reception and recording are restarted. However, if an original to be transmitted is not an urgent original, only a transmission instruction is received during reception and recording. In this case, transmission is performed at the end of recording.

The present invention is not limited to the particular embodiment described above. Various changes and modifications may be made within the spirit and scope of the invention.

What is claimed is:

1. An image communication apparatus comprising:
   memory means for storing image data;
   transmitting means for performing transmission of the image data;
   means for receiving the image data and storing the received image data in said memory means;
   recording means for recording the image data in said memory means;
   means for instructing image data transmission from said transmitting means; and
   control means for temporarily interrupting a recording operation of said recording means in response to an instruction from said instructing means during recording of said recording means and for operating said transmitting means, wherein said control means restarts the interrupted recording operation at the end of transmission by said transmitting means.

2. An apparatus according to claim 1, wherein information concerning the transmission is output at the end of the recording operation.

3. An apparatus according to claim 1, wherein said recording means records the image data stored in said memory means at the end of reception.

4. An apparatus according to claim 2, wherein the information is transmission report information.

5. An image communication apparatus comprising:
   memory means for storing image data;
   means for transmitting the image data;
   means for recording the image data;
   means for instructing image data transmission and
   control means for temporarily interrupting a recording operation of said recording means in response to an instruction from said instructing means during recording of the image data in said memory means by said recording means and for operating said transmitting means, wherein said control means restarts the interrupted recording operation at the end of transmission by said transmitting means.

6. An apparatus according to claim 4, wherein information concerning the transmission is output at the end of the recording operation.

7. An apparatus according to claim 5, further comprising means for receiving the image data and storing the received image data in said memory means.

8. An image communication apparatus comprising:
   means for reading an image;
   means for transmitting image data;
   memory means for storing the image data;
   means for switching a first mode for causing said transmitting means to send, in a real-time manner, the image read by said reading means and a second mode for transmitting the image data in said memory means after the read image is stored in said memory means;
   means for instructing image data transmission; and
   control means for temporarily interrupting a recording operation of said recording means in response to an instruction from said instructing means during recording of the image data of said memory means by said recording means and for operating said transmitting means, wherein said control means restarts the interrupted recording operation at the end of transmission by said transmitting means.

9. An apparatus according to claim 8, wherein information concerning the transmission is output at the end of the recording operation.

10. An apparatus according to claim 8, further comprising means for receiving the image data and storing the received image data in said memory means.

11. An apparatus according to claim 8, wherein said control means controls transmission in the first mode.

* * * * *